PREPARATION OF AN INSOLUBLE ACTIVE ENZYME

William L. Stanley, Richmond, Calif., assignor to the United States of America as represented by the Secretary of Agriculture
No Drawing. Filed May 20, 1970, Ser. No. 39,860
Int. Cl. C07g 7/02
U.S. Cl. 195—68                                 5 Claims

ABSTRACT OF THE DISCLOSURE

Process for preparing an insoluble but active enzyme which comprises emulsifying an aqueous dispersion of the enzyme with a solution of an organic polyisocyanate in an essentially water-immiscible solvent.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel water-insoluble but active enzyme products and methods for preparing them. Further objects of the invention will be evident from the following description wherein parts and percentages are by weight unless otherwise specified.

In recent years there has been considerable interest in preparing enzymes in insolubilized form. Such products enable enzyme-catalyzed reactions to be carried out in a simplified and efficient manner. Typically, the insolubilized enzyme is placed in a cylindrical vessel and a solution of the substrate to be reacted is passed through the enzyme column. The reaction takes place within the column and the effluent liquor contains the reaction products. With this system the enzyme can be used repeatedly for processing fresh batches of the substrate. Various techniques have been advocated for preparing insolubilized enzymes. One procedure is to entrap the enzyme in polymerizing polyacrylamide or adsorb it on insoluble media such as ion exchange resins.

In accordance with the invention, water-insoluble enzymes are prepared by reacting an enzyme with an organic polyisocyanate. The reaction is preferably carried out by an emulsion technique. Typically, the enzyme is first dispersed in water. The pH of the water may be adjusted by conventional methods to a level at which the enzyme is most dispersible or most stable. The dispersion is then agitated with a solution of the polyisocyanate in a solvent such as benzene, toluene, xylene, carbon tetrachloride, chloroform, hexane, petroleum ether, or other inert volatile solvent which is essentially immiscible with water. For best results, a conventional emulsifying agent is added to the reaction system. By using this emulsion technique, the polyisocyanate reacts rapidly with the enzyme, probably through a cross-linking mechanism involving the NCO groups of the polyisocyanate and amino, hydroxyl, or carboxyl groups of the enzyme. Regardless of the mechanism involved the important point is that the modified enzyme is rendered insoluble, yet it retains its activity.

The proportions of enzyme and polyisocyanate are not critical. If there is an excess of enzyme, the unreacted portion thereof can be removed from the product by washing with water. If there is an excess of polyisocyanate the unreacted portion thereof may be removed from the product by extraction with a solvent, or polymerized in place by washing the product with water, or simply left in the product. With regard to the last item, it may be noted that the product is used in connection with aqueous systems and isocyanates are not soluble in such systems. Accordingly, even if the excess polyisocyanate remains as such, it will not interfere with use of the product.

Following the emulsification reaction described above, the modified enzyme may be isolated in any of various ways. One technique is to evaporate the water and solvent therefrom by exposing the emulsion to a current of air or nitrogen or other non-oxidizing gas, or by subjecting it to vacuum. In a preferred technique the emulsion containing the modified enzyme is first admixed with an inert solid particulate material to increase its volume and to prepare a porous mass from which the water and solvent can be more readily removed. As the particulate material one can use such substances as calcined rice hulls, diatomaceous earth, sand, ground oyster shells, bone ash, charcoal, cellulose, and the like. If desired, the mass may be extracted with an organic solvent to remove unreacted polyisocyanate, and with water to remove undesired water-soluble substances. Formulation of the modified enzyme with a carrier as described above has the advantage that there is directly available a product which is useful in columns because liquids can readily flow through the mass.

Representative examples of polyisocyanates which may be employed in accordance with the invention include:

toluene-2,4-diisocyanate
toluene-2,6-diisocyanate
commercial mixtures of toluene-2,4- and 2,6-diisocyanates
ethylene diisocyanate
ethylidene diisocyanate
propylene-1,2-diisocyanate
cyclohexylene-1,2-diisocyanate
cyclohexylene-1,4-diisocyanate
m-phenylene diisocyanate
3,3'-diphenyl-4,4'-biphenylene diisocyanate
4,4'-biphenylene diisocyanate
3,3'-dichloro-4,4'-biphenylene diisocyanate
1,6-hexamethylenediisocyanate
1,4-tetramethylene-diisocyanate
1,10-decamethylenediisocyanate
1,5-naphthalenediisocyanate
cumene-2,4-diisocyanate
4-methoxy-1,3-phenylenediisocyanate
4-chloro-1,3-phenylenediisocyanate
4-bromo-1,3-phenylenediisocyanate
4-ethoxy-1,3-phenylenediisocyanate
2-4',diisocyanatodiphenylether
5,6-dimethyl-1,3-phenylenediisocyanate
2,4-dimethyl-1,3-phenylenediisocyanate
4,4'-diisocyanatodiphenylether
benzidinediisocyanate
4,6-dimethyl-1,3-phenylenediisocyanate
9,10-anthracenediisocyanate
4,4'-diisocyanatodibenzyl
3,3'-dimethyl-4,4'-diisocyanatodiphenylmethane
2,6-dimethyl-4,4'-diisocyanatodiphenyl
2,4-diisocyanatostilbene
3,3'-dimethyl-4,4'-diisocyanatodiphenyl
3,3'-dimethoxy-4,4'-diisocyanatodiphenyl
1,4-anthracenediisocyanate
2,5-fluorenediisocyanate
1,8-naphthalenediisocyanate
2,6-diisocyanatobenzfuran
2,4,6-toluenetriisocyanate, and
p,p',p''-triphenylmethane triisocyanate.

A useful class of polyisocyanates are those derived from polyether polyols and polyester polyols. These compounds may be prepared, as well known in the art, by reacting a polyether (or polyester) polyol with a polyisocyanate, using an excess of the latter to ensure provision of free isocyanate groups in the product. A typical, but by no means limiting, example is illustrated below:

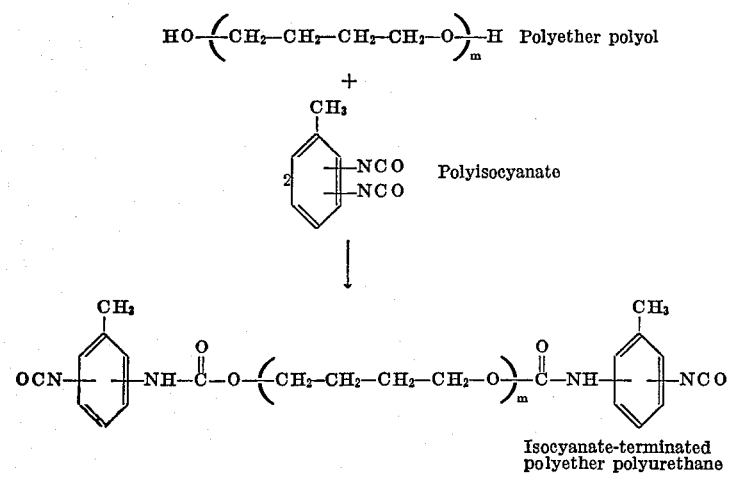

Isocyanate-terminated polyether polyurethane (In the above formulas, $m$ represents the number of tetramethyleneether repeating units. This may range, for example, about from 5 to 50.)

The compounds useful for the purposes of the invention may be prepared by reacting any of the above-exemplified polyisocyanates with any of a wide variety of polyether polyols and polyester polyols, and representative examples of these polyols are described below.

Among the polyether polyols which may be so used are those prepared by reaction of an alkylene oxide with an initiator containing active hydrogen groups, a typical example of the initiator being a polyhydric alcohol such as ethylene glycol. The reaction is usually carried out in the presence of either an acidic or basic catalyst. Examples of alkylene oxides which may be employed in the synthesis include ethylene oxide, propylene oxide, any of the isomeric butylene oxides, and mixtures of two or more different alkylene oxides such as mixtures of ethylene and propylene oxides. The resulting polymers contain a polyether backbone and are terminated by hydroxyl groups. The number of hydroxyl groups per polymer molecule is determined by the functionality of the active hydrogen initiator. For example, a difunctional alcohol such as ethylene glycol (as the active hydrogen initiator) leads to polyether chains in which there are two hydroxyl groups per polymer molecule. When polymerization of the oxide is carried out in the presence of glycerol, a trifunctional alcohol, the resulting polyether molecules contain an average of three hydroxyl groups per molecule. Even higher functionality—more hydroxyl groups—is obtained when the oxide is polymerized in the presence of such polyols as pentaerythritol, sorbitol, dipentaerythritol, and the like. In addition to those listed above, other examples of polyhydric alcohols which may be reacted with alkylene oxides to produce useful polyether polyols include:

propylene glycol
trimethylene glycol
1,2-butylene glycol
1,3-butanediol
1,4-butanediol
1,5-pentanediol
1,2-hexylene glycol
1,10-decanediol
1,2-cyclohexanediol
2-butene-1,4-diol
3-cyclohexene-1,1-dimethanol
4-methyl-3-cyclohexene-1,1-dimethanol
3-methylene-1,5-pentanediol
diethylene glycol
(2-hydroxyethoxy)-1-propanol
4-(2-hydroxyethoxy)-1-butanol
5-(2-hydroxypropoxy)-1-pentanol
1-(2-hydroxymethoxy)-2-hexanol
1-(2-hydroxypropoxy)-2-octanol
3-allyloxy-1,5-pentanediol
2-allyloxymethyl-2-methyl-1,3-propanediol
[(4-pentyloxy)methyl]-1,3-propanediol
3-(o-propenylphenoxy)-1,2-propane diol
thiodiglycol
2,2'-[thiobis(ethyleneoxy)]diethanol
polyethyleneether glycol (molecular weight about 200)
2,2'-isopropylidenebis(p-phenyleneoxy)diethanol
1,2,6-hexanetriol
1,1,1-trimethylolpropane
3-(2-hydroxyethoxy)-1,2-propanediol
3-(2-hydroxypropoxy)-1,2-propanediol
2,4-dimethyl-2-(2-hydroxyethoxy)methylpentanediol-1,5
1,1,1-tris[(2-hydoxyethoxy)methyl]ethane
1,1,1-tris[(2-hydroxypropoxy)methyl]propane
triethanolamine
triisopropanolamine
resorcinol
pyrogallol
phloroglucinol
hydroquinone
4,6-di-tertiarybutyl catechol
catechol
orcinol
methylphloroglucinol
hexylresorcinol
3-hydroxy-2-naphthol
2-hydroxy-1-naphthol
2,5-dihydroxy-1-naphthol
bis-phenols such as 2,2-bis-(p-hydroxyphenyl)propane and bis-(p-hydroxyphenyl)methane
1,1,2-tris-(hydroxyphenyl)ethane
1,1,3-tris-(hydroxyphenyl)propane.

An especially useful category of polyether polyols are the polytetramethylene glycols. They are prepared by the ring-opening polymerization of tetrahydrofuran, and contain the repeating unit

in the polymer backbone. Termination of the polymer chains is by hydroxyl groups.

The polyester polyols which may be employed as precursors are most readily prepared by condensation polymerization of a polyol with a polybasic acid. The polyol and acid reactants are used in such proportions that essentially all the acid groups are esterified and the resulting chain of ester units is terminated by hydroxyl groups. Representative examples of polybasic acids for producing these polymers are oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β- hydromuconic acid, α-butyl-α-ethylglutaric acid, α,β-diethylsuccinic acid, o-phthalic acid, isophthalic acid, terephthalic acid, hemimellitic acid, trimellitic acid, trimesic acid, mellophanic acid, prehnitic acid, pyromelltic acid, citric acid, benzenepentacarboxylic acid, 1,4-cyclohexanedicarboxylic acid, diglycollic acid, thiodiglycollic acid, dimerized oleic acid, dimerized linoleic acid, and the like. Representative examples of polyols for forming these polymers include ethylene glycol, 1,3-propylene glycol, 1,2-propylene glycol, 1,4-butylene glycol, 1,3-butylene glycol, 1,2-butylene glycol, butene-1,4-diol, 1,5--pentane diol, 1,4-pentane diol, 1,3-pentane diol, 1,6-hexane diol, hexene-1,6-diol, 1,7-heptane diol, diethylene glycol, glycerine, trimethylol propane, 1,3,6-hexanetriol, trimethanolamine, pentaerythritol, sorbitol, and any of the other polyols listed hereinabove in connection with the preparation of polyether polyols.

The invention may be applied to enzymes of all kinds, illustrative examples being alcohol dehydrogenase, amino acid oxidases, α- and β-amylases, arginase, asparaginase, catalase, cellulase, chymotrypsin, collagenase, deoxyribonuclease, diaphorase, elastin, emulsin, ficin, glucose, oxidase, histidase, hyaluronidase, phosphatases, lipase, lipoxidase, lysozyme, papain, chymopapain, pepsin, pectin methyl esterase, polyphenol oxidase, ribonuclease, trypsin, tyrosinase, urease, etc. The starting enzyme need not be a purified substance but may be a preparation containing an enzyme. Thus, for example, one may employ microbial preparations which contain enzymes, typically, cultures or cells of yeasts, molds, bacteria, and the like. Other enzyme-containing preparations which may be applied to reaction with the polyisocyanate are such materials (preferably in dried comminuted form) as animal organs, e.g., pancreas, liver, etc., insects and insect parts, barley malt, pineapple, papaya, etc.

The invention is demonstrated by the following illustrative examples.

The buffer solution referred to in the examples was prepared as follows: 19.4 ml. of 0.1 M citric acid was mixed with 20.6 ml. of 0.2 M $Na_2HPO_4$ and the resulting solution was adjusted to pH 5 by addition of citric acid solution or sodium phosphate solution as required.

EXAMPLE 1

Three grams of commercial amyloglucosidase were dissolved in 50 ml. buffer solution, and filtered to remove undissolved material.

A commercial polyisocyanate (5 g.) and 1 g. of a nonionic emulsifying agent (a dialkylphenoxy polyoxyethylene glycol) were dissolved in 100 ml. of methylchloroform. The polyisocyanate contains 9.5% free NCO, and is believed to have the structure.

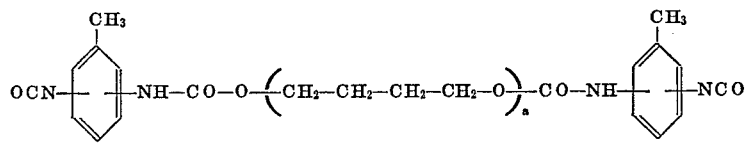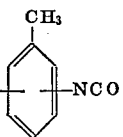

wherein a is approximately 7.

The enzyme solution was laced in a blender and, while stirring it, the polyisocyanate solution was added in small increments over a period of about 2 minutes. The emulsion was stirred an additional minute, then stored in a refrigerator.

Rice hulls were calcined and screened through a 48-mesh screen to remove fines, the coarser particles being retained.

Five g. of the calcined rice hulls were wetted with the emulsion and put into a glass column. Air, at room temperature, was blown upwardly through the column for about 3 hours to evaporate solvent and water.

1.7 grams of the dried material was then placed in a column, 12 mm. I.D., 6 cm. high. The column was washed with buffer solution until there was no evidence of enzyme in the washings.

A solution of 0.5% starch in buffer solution was then passed through the column and the eluate tested for glucose (as an indication of the activity of the insolubilized enzyme). When the starch solution (which initially tested negative for glucose) was passed through the column at the rate of 4 drops per minute, the eluated contained 0.45 gm. of glucose per ml. At the rate of 40 drops per minute, the eluate contained 0.15 mg. of glucose per ml.

EXAMPLE 2

Thre grams of a coemmercial polygalacturonase preparation used for clarifying fruit juices was dissolved in 95 ml. buffer and filtered.

Three grams of polyisocyanate (same as in Example 1) was dissolved in 100 ml. of methylchloroform and the solution put in a blender. While stirring, the enzyme solution was added over a period of about 2 minutes. A nonionic emulsifier (0.2 g., the same emulsifier as in Example 1) was added and the emulsion stirred another minute.

Twenty grams of the emulsion was poured over 5 g. of calcined rice hulls and the product blown as above described for about 6 hours.

The dried product was packed into a column, 12 mm., I.D., 7 cm. tall. The column was washed thoroughly with buffer solution until it gave a negative test for carbohydrates.

A 0.5% pectin solution in buffer was prepared and passed through the column. The viscosity of the eluate was measured with a capillary viscometer. The point of this test is that pectin is degraded by polygalacturonase, hence activity of the enzyme product will be indicated by decrease of the treated pectin solution. The following results were obtained:

| Flow rate, drops/min.: | Intrinsic viscosity of eluate [1] |
|---|---|
| 60 | 1.00 |
| 10 | 0.68 |

EXAMPLE 3

*Botrytis cinerea* was grown on an aqueous medium containing potassium acid tartrate and yeast extract. The cells were removed, the broth being retained for further use. This broth contained various enzymes including peroxidase, plus 0.6 g./liter of polyglucans. To prepare the broth for the next step, ½ g. of the same emulsifier as in Example 1 was dissolved in 100 ml. thereof.

Three grams of polyisocyanate (same as in Example 1) was dissolved in 100 ml. of methylchloroform and the solution placed in a blender. While stirring the polyisocyanate solution, the broth was added over a period of about 4 minutes, then the emulsion was stirred for another minute.

Fifteen grams of the emulsion was poured over 4 g. of calcined rice hulls and the product blown as above described for about 3 hours, but using nitrogen instead of air.

The dried product was then thoroughly washed with pH 5 buffer solution. The washed product was found to exhibit peroxidase activity. For example, when contacted with 3% aqueous hydrogen peroxide it released a copious volume of oxygen gas.

Having thus described the invention, what is claimed is:
1. A process for preparing an insoluble but active enzyme which comprises
    (a) emulsifying an aqueous dispersion of the enzyme with a solution of an organic polyisocyanate in a volatile, essentially water-immiscible solvent,

(b) mixing the resulting emulsion with a solid carrier in particulate form, and (c) evaporating volatile components from the resulting mixture.

2. The process of claim 1 wherein the evaporation is effectuated by blowing a gas through the mixture.

3. The process of claim 1 wherein the carrier is calcined rice hulls.

4. A process for preparing an insoluble but active enzyme which comprises (a) emulsifying an aqueous microbial culture containing at least one enzyme with a solution of an organic polyisocyanate in a volatile, essentially water-immiscible solvent, (b) mixing the resulting emulsion with a solid carrier in particulate form, and (c) evaporating volatile components from the resulting mixture.

5. The process of claim 4 wherein the microbial culture is a culture of *Botrytis cinerea.*

References Cited

UNITED STATES PATENTS

| | | | |
|---|---|---|---|
| 3,243,356 | 3/1966 | Kitimura et al. ----- | 195—68 X |

FOREIGN PATENTS

| | | | |
|---|---|---|---|
| 634,668 | 1963 | Belgium ------------ | 252—316 |

OTHER REFERENCES

Silman et al.: Annual Review of Biochemistry, Annual Reviews, Inc., Palo Alto, Calif., vol. 35, part II, 1966 (pp. 876–880) QP501A7.

Goodman, H. S.: Chromatographic Fractionation and Characterization of Antibody, Based on the Thermal Dissociation of the Specific Antigen-Antibody Complex, Nature, vol. 193, January 1962 (pp. 350–353) QIN2.

A. LOUIS MONACELL, Primary Examiner

D. M. NAFF, Assistant Examiner

U.S. Cl. X.R.

195—63, DIG 11